US012700150B2

(12) United States Patent
Zhou et al.

(10) Patent No.: US 12,700,150 B2
(45) Date of Patent: Aug. 4, 2026

(54) INPAINTING DISPATCH TECHNIQUES FOR DIGITAL IMAGES

(71) Applicant: Adobe Inc., San Jose, CA (US)

(72) Inventors: Yuqian Zhou, Bellevue, WA (US); Zhe Lin, Clyde Hill, WA (US); Xiaoyang Liu, Bellevue, WA (US); Sohrab Amirghodsi, Seattle, WA (US); Qing Liu, Santa Clara, CA (US); Lingzhi Zhang, Philadelphia, PA (US); Elya Schechtman, Seattle, WA (US); Connelly Stuart Barnes, Seattle, WA (US)

(73) Assignee: Adobe Inc., San Jose, CA (US)

( * ) Notice: Subject to any disclaimer, the term of this patent is extended or adjusted under 35 U.S.C. 154(b) by 275 days.

(21) Appl. No.: 18/212,992

(22) Filed: Jun. 22, 2023

(65) Prior Publication Data

US 2024/0428384 A1     Dec. 26, 2024

(51) Int. Cl.
*G06T 5/77* (2024.01)
*G06T 11/60* (2026.01)

(52) U.S. Cl.
CPC ................ *G06T 5/77* (2024.01); *G06T 11/60* (2013.01)

(58) Field of Classification Search
None
See application file for complete search history.

(56) References Cited

U.S. PATENT DOCUMENTS

| | | | |
|---|---|---|---|
| 8,571,328 B2 | 10/2013 | Shechtman et al. | |
| 2023/0142630 A1* | 5/2023 | Brodie ................. | G06V 30/166 382/157 |
| 2023/0245281 A1* | 8/2023 | Bhattacharya ........... | G06T 5/77 382/107 |
| 2026/0134524 A1 | 5/2026 | Barnes et al. | |

OTHER PUBLICATIONS

Chatterjee et al, Comparative Study of OpenCV Inpainting Algorithms, 2021.*
Le et al, Object removal from complex videos using a few annotations, Sep. 2019.*
Rane et al, Structure and Texture Filling-In of Missing Image Blocks in Wireless Transmission and Compression Applications, Mar. 2003.*
Barnes, Connelly Stuart, et al., "Pursuant to MPEP § 2001.06(b) the applicant brings the following co-pending application to the Examiner's attention:", U.S. Appl. No. 18/942,015, filed Nov. 8, 2024, 53 pages.

(Continued)

*Primary Examiner* — Fan Zhang
(74) *Attorney, Agent, or Firm* — FIG. 1 Patents

(57) ABSTRACT

Inpainting dispatch techniques for digital images are described. In one or more examples, an inpainting system includes a plurality of inpainting modules. The inpainting modules are configured to employ a variety of different techniques, respectively, as part of performing an inpainting operation. An inpainting dispatch module is also included as part of the inpainting system that is configured to select which of the plurality of inpainting modules are to be used to perform an inpainting operation for one or more regions in a digital image, automatically and without user intervention.

20 Claims, 9 Drawing Sheets

(56) References Cited

OTHER PUBLICATIONS

Barnes, Connelly , et al., "PatchMatch: A Randomized Correspondence Algorithm for Structural Image Editing", ACM SIGGRAPH 2009 Papers (New Orleans, Louisiana, Aug. 3-7, 2009) [retrieved Jun. 22, 2023]. Retrieved from the Internet <https://faculty.idc.ac.il/arik/seminar2009/papers/patchMatch.pdf>., Aug. 3, 2009, 10 pages.

Rombach, Robin , et al., "High-Resolution Image Synthesis with Latent Diffusion Models", Cornell University arXiv, arXiv.org [retrieved Aug. 11, 2023]. Retrieved from the Internet <https://arxiv.org/pdf/2112.10752.pdf>., Apr. 13, 2022, 45 Pages.

Saharia, Chitwan , et al., "Photorealistic Text-to-Image Diffusion Models with Deep Language Understanding", Cornell University arXiv, arXiv.org [retrieved Aug. 11, 2023]. Retrieved from the Internet <https://arxiv.org/pdf/2205.11487.pdf>., May 23, 2022, 46 Pages.

Zhang, Lingzhi , et al., "Inpainting at Modern Camera Resolution by Guided PatchMatch with Auto-Curation", ECCV 2022 [retrieved Jun. 22, 2023]. Retrieved from the Internet <https://www.ecva.net/papers/eccv_2022/papers_ECCV/papers/136770051.pdf>., Aug. 6, 2022, 18 Pages.

Zhang, Lingzhi , et al., "Perceptual Artifacts Localization for Inpainting", Cornell University arXiv, arXiv.org [retrieved Jun. 22, 2023]. Retrieved from the Internet <https://arxiv.org/pdf/2208.03357.pdf>., Aug. 5, 2022, 30 Pages.

* cited by examiner

200

300

400

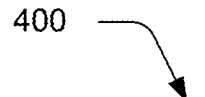

Inpainting Dispatch Module 118

Region Clustering Module 208

Region Labeling Module 402

Labeled Regions 404

Merging Module 406

Threshold Size 410

Merged Regions 408

Classification Module 412

Classified Regions 414

Optimization Module 416

Merging Module 418

Region Detection
Module 212

Size Determination
Module 214

Structure
Determination
Module 216

Machine-learning
Module 218

Inpainting
Selection 206

Regions 420

Classification 422

Fig. 4

Fig. 5

600

Inpainting System 116

106

222

700
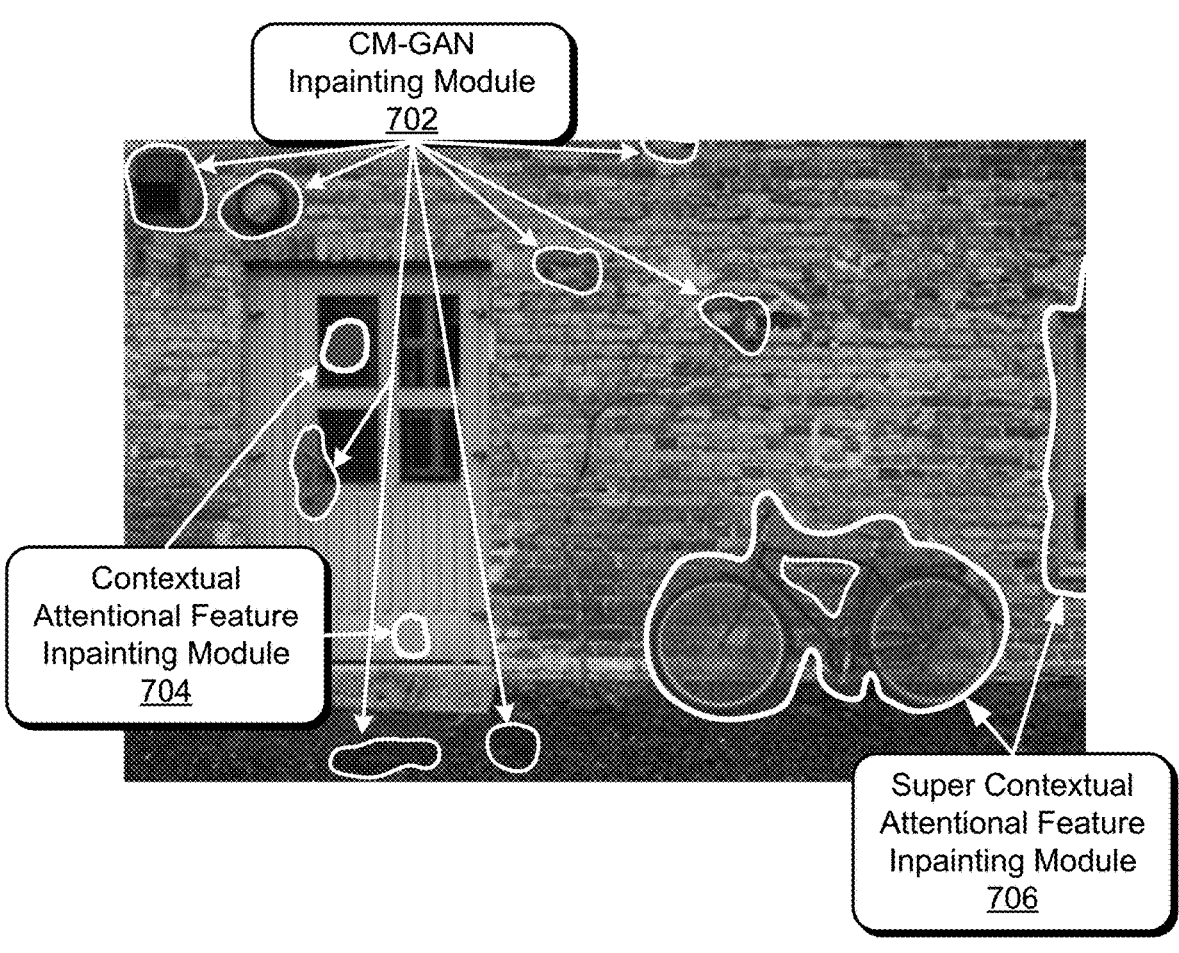
Fig. 7

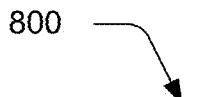

800

802
Receive a digital image having one or more regions that are identified for use as part of an inpainting operation

804
Generate an inpainting selection referencing an inpainting module

806
Generating an edited digital image having an inpainting region generated by the inpainting operation as applied to the one or more regions by the referenced inpainting module

808
Receive the digital image

810
Display the received digital image in a user interface

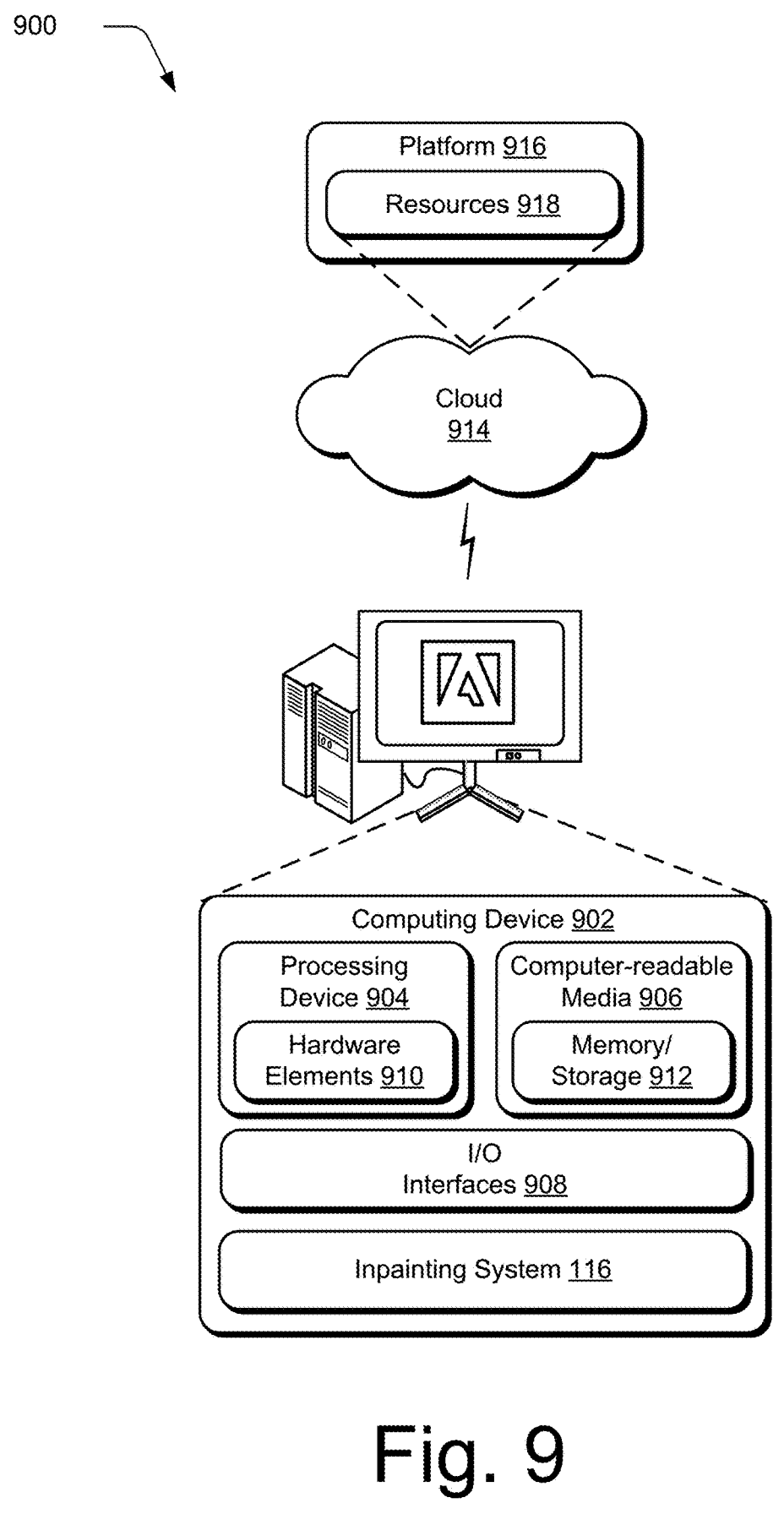

Platform 916

Resources 918

Cloud
914

Computing Device 902

Processing
Device 904

Hardware
Elements 910

Computer-readable
Media 906

Memory/
Storage 912

I/O
Interfaces 908

Inpainting System 116

Fig. 9

INPAINTING DISPATCH TECHNIQUES FOR DIGITAL IMAGES

BACKGROUND

Inpainting operations are utilized by digital image editing systems to generate color values for pixels in regions within a digital image. Inpainting operations are leveraged to support a variety of digital image editing functionalities, examples of which include object removal, hole filling, visual artifact correction, and so forth.

To do so, a variety of different inpainting modules may be utilized that employ a variety of different inpainting techniques, which in conventional techniques are manually chosen by a user. These different inpainting techniques, however, have different strengths and weaknesses that involve detailed knowledge on the part of the user, which often results in errors in real world scenarios and computational resource inefficiencies through repeated use of the variety of inpainting modules to achieve a visually pleasing result.

SUMMARY

Inpainting dispatch techniques for digital images are described. In one or more examples, an inpainting system includes a plurality of inpainting modules. The inpainting modules are configured to employ a variety of different techniques, respectively, as part of performing an inpainting operation. An inpainting dispatch module is also included as part of the inpainting system that is configured to select which of the plurality of inpainting modules are to be used to perform an inpainting operation for one or more regions in a digital image, automatically and without user intervention. As a result, the techniques described herein have increased accuracy, reduce computation resource consumption, and reduce an amount of time used to achieve a desired result.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures Entities represented in the figures are indicative of one or more entities and thus reference is made interchangeably to single or plural forms of the entities in the discussion.

FIG. 4 depicts a system in an example implementation showing operation of an inpainting dispatch module and associated region clustering module of FIG. 2 in greater detail.

FIG. 5 depicts an example implementation of clustering and inpainting module assignments made by an inpainting dispatch module.

FIG. 7 depicts an example implementation of generation of an inpainting selection that identifies use of a plurality of different inpainting modules to apply inpainting operations to a single digital image.

FIG. 8 is a flow diagram depicting an algorithm as a step-by-step procedure in an example implementation of operations performable for accomplishing a result of an inpainting dispatch technique for inpainting module selection.

FIG. 9 illustrates an example system including various components of an example device that can be implemented as any type of computing device as described and/or utilize with reference to FIGS. 1-8 to implement embodiments of the techniques described herein.

DETAILED DESCRIPTION

Overview

Figure 1:
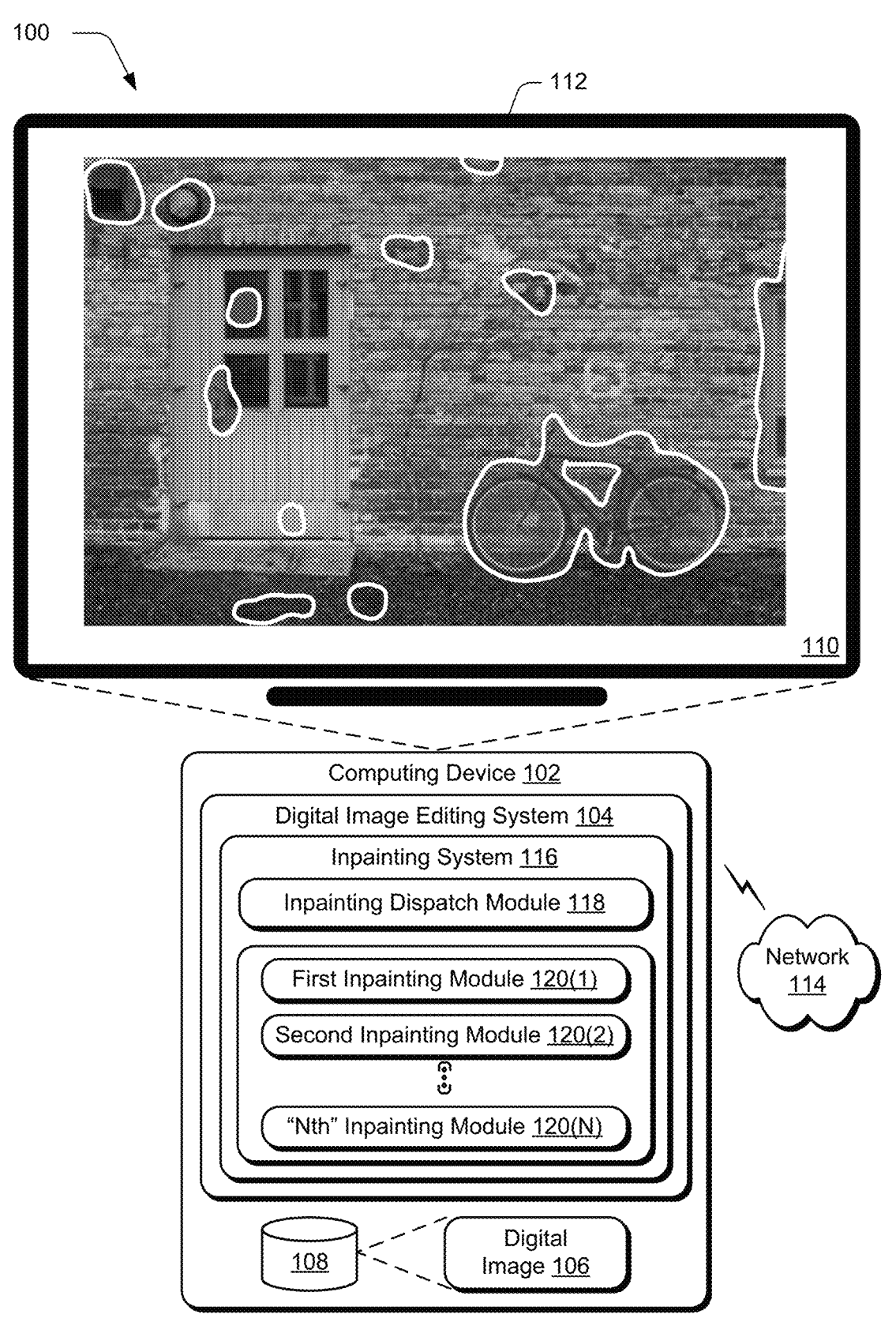
FIG. 1 is an illustration of an environment in an example implementation that is operable to employ inpainting dispatch techniques for digital images as described herein.

Inpainting operations are used to support a variety of digital image editing functionalities. Conventional techniques to do so involve manual selection from a plurality of different types of inpainting modules that are configured to support a variety of techniques used to perform the inpainting operations. Accordingly, conventional techniques involve use of detailed user knowledge as to strengths and weakness of the different types of inpainting modules. These strengths and weaknesses may not be readily apparent nor easily obtained without spending significant amounts of time and thus are inaccessible to casual users.

Consequently, real world scenarios often involve repeated user interaction through the variety of inpainting modules to obtain a desired result, which may not be readily apparent to the user due to difficulties in a human's ability to manually discern differences between results of inpainting operations. Additionally, conventional techniques typically consume significant amounts to time to perform the repeated inpainting operations, which cause inefficient computational resource and power consumption.

To address these technical challenges, inpainting dispatch techniques for digital images are described. In one or more examples, an inpainting system includes a plurality of inpainting modules. The inpainting modules are configured to employ a variety of different techniques, respectively, as part of performing an inpainting operation. The inpainting modules, for instance, are configurable to implement texture-based techniques, structure-based techniques, use a generative adversarial network, employ diffusion-based techniques, and so on. Each of which include different strengths and weaknesses when employed to carry out an inpainting operation.

Accordingly, an inpainting dispatch module is also included as part of the inpainting system that is configured to select which of the plurality of inpainting modules are to be used to perform an inpainting operation for one or more regions in a digital image, automatically and without user intervention. As a result, the techniques described herein have increased accuracy, reduce computation resource consumption, and reduce an amount of time used to achieve a desired result.

An inpainting system, in an example, receives a digital image having one or more regions that are specified as a subject of an inpainting operation, i.e., are to be "filled" using the inpainting operation. The one or more regions, for instance, are specified via a user input via a user interface using freeform lines, bounding boxes, and so on to indicate objects that are to be removed. In another instance, the regions are detected automatically and without user intervention, e.g., via an artifact detection module or other object detection technique.

The inpainting system then employs an inpainting dispatch module to control which inpainting modules are to be used for respective regions in the digital image. In this way, multiple inpainting modules may be used for a single digital image for different regions within the digital image. The inpainting dispatch module is configured to select the inpainting modules based on a variety of considerations, including available computational resources, characteristics of the regions, characteristics of operation of the inpainting modules, and so forth.

The inpainting dispatch module, for instance, receives the digital image having the one or more regions. The inpainting dispatch module begins by using a region clustering module to cluster and merge the one or more regions, e.g., based on a distance between each other. Clustering is usable, for instance, to improve computational efficiency by reducing a number of "passes" performed by respective inpainting modules to perform inpainting operations.

A resource detection module is also employable by the inpainting dispatch module to select an inpainting module from a plurality of inpainting modules based on available resources. The resource detection module, for instance, may select an inpainting module available from a service provider system "in the cloud" when having a stable network connection without data capacity limitations.

The inpainting dispatch module is also configurable to select the inpainting module based on characteristics of the regions and corresponding strengths or weaknesses in the operation of the inpainting modules. For a region having a size that is over a threshold amount (e.g., number of pixels), for instance, an inpainting module is selected that is configured to perform an inpainting operation having that size.

The inpainting dispatch module is also configured to select an inpainting module based on a structure exhibited in an area of the digital image proximal to the one or more regions through use of a structure determination module. The structure determination module, for instance, generates a structure map in a "shape of a donut" around the one or more regions. The structure determination module then determines an amount of variability in the structure map, e.g., based on intensity values of corresponding pixels and an amount variance between the color values and/or a number of variances. Variability over a threshold amount may therefore cause selection of a first inpainting module (e.g., a generative adversarial based module) where variability below the threshold amount is assigned to a texture-based inpainting module.

Machine-learning models may also be employed by the inpainting dispatch module in order to select an inpainting module. The machine-learning models, for instance, may be trained using training data to learn which models achieve the most accurate results in corresponding scenarios, which models are selected by users in real-world scenarios, learn to balance an amount of time to perform with results obtained, and so forth.

In this way, the inpainting dispatch module is configurable to address a wide range of functionalities available from a variety of inpainting modules. The inpainting dispatch module is also configurable to dynamically address and adapt to new functionalities and strengths and weaknesses of those functionalities become available. Further discussion of these and other examples is included in the following sections and shown in corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Inpainting Environment

FIG. 1 is an illustration of a digital medium environment 100 in an example implementation that is operable to employ inpainting dispatch techniques for digital images as described herein. The illustrated environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone as illustrated), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 9.

The computing device 102 is illustrated as including a digital image editing system 104. The digital image editing system 104 is implemented at least partially in hardware of the computing device 102 to process and transform a digital image 106, which is illustrated as maintained in a storage device 108 of the computing device 102. Such processing includes creation of the digital image 106, modification of the digital image 106, and rendering of the digital image 106 in a user interface 110 for output, e.g., by a display device 112. Although illustrated as implemented locally at the computing device 102, functionality of the digital image editing system 104 is also configurable as whole or part via functionality available via the network 114, such as part of a web service or "in the cloud."

An example of functionality incorporated by the digital content editing system 104 to process the digital image 106 is illustrated as an inpainting system 116. An inpainting operation is utilized to set color values for pixels within a defined region of the digital image. Inpainting operations are usable to support a variety of image processing functionalities, examples of which include object removal, hole filling, visual artifact correction, image restoration, image synthesis, and so forth. In the illustrated user interface 110, for instance, regions are defined for object removal in the digital image.

The inpainting system 116 includes an inpainting dispatch module 118 that is configured to control which inpainting modules are used for an inpainting operation, examples of which are illustrated as a first inpainting module 120(1), a second inpainting module 120(2), . . . , "Nth" inpainting module 120(N). The inpainting dispatch module 118, for instance, selects an inpainting module to set color values of pixels within the regions that is visually consistent and semantically coherent with an area of the digital image that is proximal to the regions. The inpainting dispatch module 118 is configured to select the inpainting modules based on available resources, characteristics of a region being filled (e.g., size, structure), and so forth. In this way, the inpainting dispatch module 118 overcomes conventional technical challenges that relied on manual user selection which is prone to error and results in overconsumption of computing resources. Further discussion of these and other examples is included in the following section and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Inpainting Dispatch Techniques

The following discussion describes inpainting dispatch techniques that are implementable utilizing the described systems and devices. Aspects of each of the procedures are implemented in hardware, firmware, software, or a combination thereof. The procedures are shown as a set of blocks that specify operations performable by hardware and are not necessarily limited to the orders shown for performing the operations by the respective blocks. Blocks of the procedures, for instance, specify operations programmable by hardware (e.g., processor, microprocessor, controller, firmware) as instructions thereby creating a special purpose machine for carrying out an algorithm as illustrated by the flow diagram. As a result, the instructions are storable on a computer-readable storage medium that causes the hardware to perform algorithm. In portions of the following discussion, reference will be made in parallel with FIG. 8, which is a flow diagram depicting an algorithm 800 as a step-by-step procedure in an example implementation of operations performable for accomplishing a result of an inpainting dispatch technique for inpainting module selection.

Figure 2:
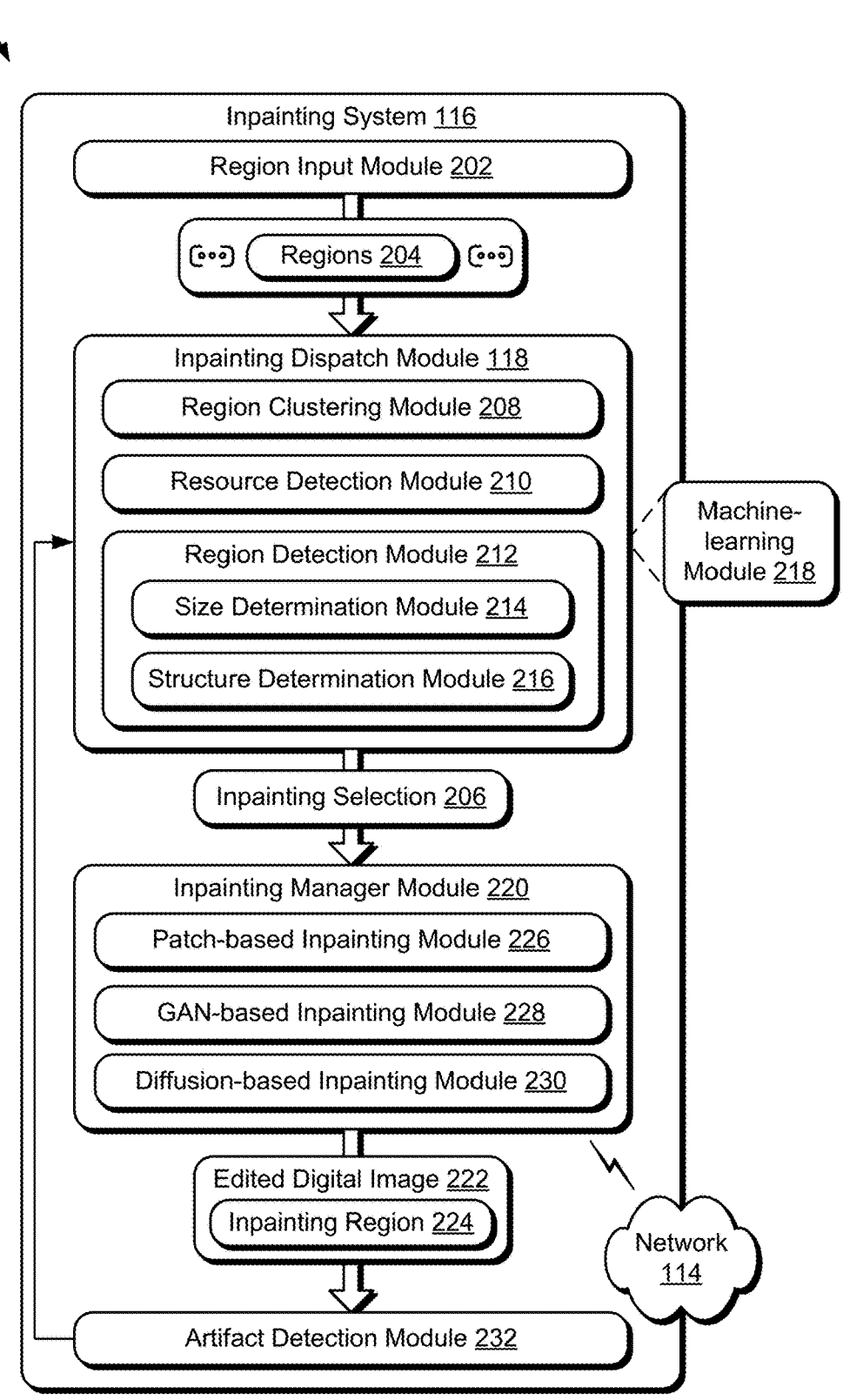
FIG. 2 depicts a system in an example implementation showing operation of an inpainting system and inpainting dispatch module of FIG. 1 in greater detail.

FIG. 2 depicts a system 200 in an example implementation showing operation of an inpainting system and inpainting dispatch module of FIG. 1 in greater detail. The inpainting system 116 includes a region input module 202 to define one or more regions 204 that are to be subject of an inpainting operation. In a first example, the region input module 202 generates a user interface 110, via which, user inputs are received identifying corresponding regions, e.g., as freeform lines drawn with a gesture, a bounding box defined using a "click-and-drag" operation using a cursor control device, and so forth. In a second example, the region input module 202 is configured to identify the one or more regions 204 automatically and without user intervention, e.g., as part of automated artifact detection, using object detection as part of machine learning responsive to a user input (e.g., a spoken utterance of "remove bicycle"), and so on.

The digital image having the one or more regions 204 is then received by an inpainting dispatch module 118 (block

802). The inpainting dispatch module 118 is configured to generate an inpainting selection 206 referencing an inpainting module selected from a plurality of inpainting modules (block 804). To do so, the inpainting dispatch module 118 is configured to take a variety of considerations and characteristics into account as part of selecting an inpainting module and corresponding inpainting technique implemented by the module. Illustrated examples of which include a region clustering module 208, a resource detection module 210, a region detection module 212. The region detection module 212 includes a size determination module 214 and a structure determination module 214. A machine-learning module 218 is also illustrated that is trainable and retrainable to generate the inpainting selection 206 based on a variety of different factors.

The region clustering module 208 is configured to employ clustering techniques to generate clusters of the one or more regions 204. Clustering, for instance, is usable to combine and merge the one or more regions 204 as further described in relation to FIG. 4 to improve operational efficiency, e.g., for processing in a "single pass" by a respective inpainting module.

A resource detection module 210 is configured to employ resource considerations as part of generating the inpainting selection 206. Resource considerations, for instance, take into account an amount of computational resources available by the inpainting system 116 to perform the inpainting operation by respective inpainting modules. In an instance in which a resource intensive inpainting module is available over a high bandwidth connection via a network 114, for instance, that inpainting module is selected. In another instance in which a mobile device is utilized to execute the same inpainting module locally, however, with limited resources another inpainting module is selected.

The resource detection module 210 is also configurable to balance an amount of computational resource consumption by the plurality of inpainting modules, respectively, and quality of the inpainting region generated by the plurality of inpainting modules, respectively. The resource detection module 210, for instance, may provide a default option that gives greater weight to an inpainting module that has increased efficiency but lower image quality for casual use and provide an option for increased image quality but lower efficiency for other advanced uses in which increased visual coherence is desired. Thus, in this instance the resource detection module 210 supports a tradeoff between runtime versus quality.

Privacy considerations may also be implemented by the resource detection module 210. A user, for instance, may indicate a preference for processing to be performed locally at a computing device 102 to maintain privacy. Therefore, the resource detection module 210 selects from the inpainting modules as implementing resources that are local to the computing device 102 such that the digital image is not exposed "outside" of the computing device 102, e.g., over the network 114. In another example, the resource detection module 210 also selects from remote inpainting modules that have attested as maintaining a described degree of privacy, e.g., through verified credentials, security certificates, and so forth. Other resource detection examples are also contemplated.

The region detection module 212 is configurable to select the inpainting modules based on the one or more regions 204 (e.g., directly and/or from the region clustering module 208), themselves. A size determination module 214, for instance, is utilized to select an inpainting module based on a size of a respective region. For example, a first inpainting module is configured to support performance of an inpainting operation for regions having a size (e.g., amount of pixels) that is greater than a size supported by other inpainting modules. The size determination module 214 therefore selects the first inpainting module for regions having a threshold size that is greater than that supported by the other inpainting modules.

Figure 3:
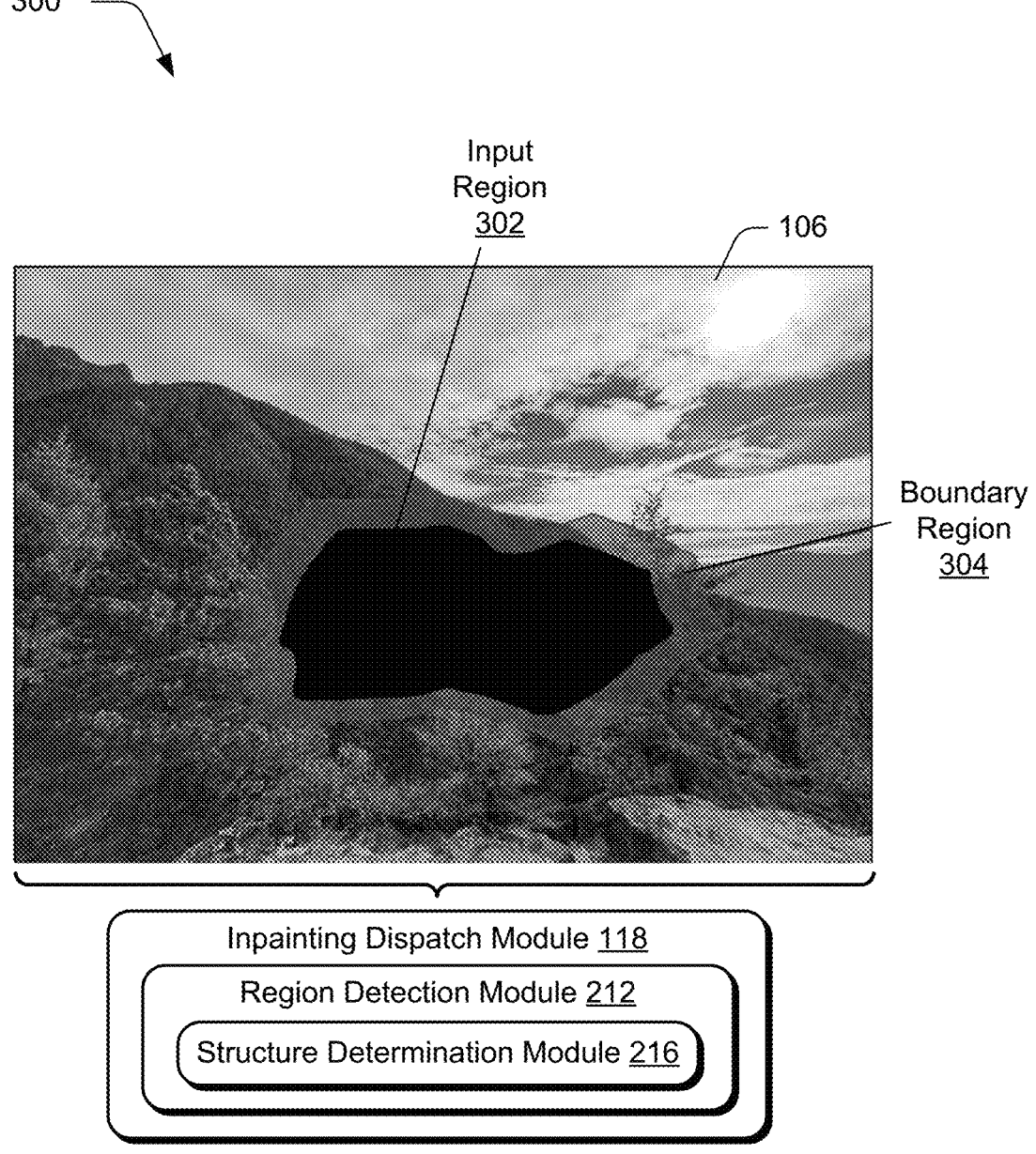
FIG. 3 depicts a system in an example implementation showing operation of an inpainting system and structure determination module of FIG. 2 in greater detail.

FIG. 3 depicts a system 300 in an example implementation showing operation of an inpainting system and structure determination module of FIG. 2 in greater detail. The structure determination module 216 is configured to select from the inpainting modules based on an amount of structure associated with the one or more regions 204, respectively.

In the illustrated example, an input region 302 is depicted. The structure determination module 216 identifies an area disposed proximal to the input region 302 as a boundary region 304. The structure determination module 216 then determines an amount of structure exhibited by the boundary region 304 and uses this amount to select a respective inpainting module.

The structure determination module 216, for instance, is configured to distinguish between structural components and textures in the boundary region 304 and based on this select a corresponding inpainting module. In one example, structure is extracted from texture based on relative total variation (RTV) which measures a difference (e.g., relative difference) between intensities in neighboring pixels in the boundary region 304. The structure determination module 216, for instance, calculates the RTV measure as an optimization problem, further discussion of which may be found in "Structure Extraction from Texture via Natural Variation Measure" by Li Xu, Qiong Yan, Yang Xia and Jiaya Jia, ACM Transactions on Graphics (SIGGRAPH Asia), 2012, the entire disclosure of which is hereby incorporated by reference.

In another example, a machine-learning module 218 is utilized by the inpainting dispatch module 118 to generate the inpainting selection 206. A machine-learning model refers to a computer representation that can be tuned (e.g., trained and retrained) based on inputs to approximate unknown functions. In particular, the term machine-learning model can include a model that utilizes algorithms to learn from, and make predictions on, known data by analyzing training data to learn and relearn to generate outputs that reflect patterns and attributes of the training data. The training data for this instance is configurable to describe use of particular inpainting modules to learn which results achieve the greatest amount of accuracy, based on user interaction data that describes user preferences in selecting inpainting modules, and so forth. Examples of machine-learning models include neural networks, convolutional neural networks (CNNs), long short-term memory (LSTM) neural networks, decision trees, and so forth.

The inpainting dispatch module 118 generates the inpainting selection 206 as indicating a respective region and a respective inpainting module that is to be utilized to perform an inpainting operation. The inpainting selection 206 is then passed as an input to an inpainting manager module 220. The inpainting manager module 220 is utilized to generate an edited digital image 222 having an inpainting region 224. The inpainting region 224 is generated through application of the inpainting operation to the one or more regions as performed by the referenced inpainting module (block 806).

The inpainting manager module 220 includes a plurality of different inpainting modules that are representative of different ways to implement inpainting operations. As such, the inpainting modules are configurable to have a variety of strengths and/or weakness. The inpainting dispatch module 118 is therefore configured to select from the inpainting modules to address these considerations, automatically and without user intervention.

Examples of different types of functionalities utilized to implement inpainting operations includes a patch-based inpainting module 226, a GAN-based inpainting module 228, and a diffusion-based inpainting module 230. An example of a patch-based inpainting module 226 is configured to implement contextual attentional feature (CAF) inpainting that implements interactive image editing tools using a randomized algorithm for finding approximate nearest-neighbor matches between image patches. Examples of which are described in "PatchMatch: A randomized correspondence algorithm for structural image editing" to C Barnes, E. Shechtman, A Finkelstein, DB Goldman-ACM Trans. Graph., 2009 and "Determining correspondence between image regions" to E Shechtman, D Goldman, C Barnes, A Finkelstein in U.S. Pat. No. 8,571,328, the entire disclosures of which are hereby incorporated by reference.

In another example of a patch-based inpainting module 226, "SuperCAF" supports deep learning by establishing guide images (e.g., for structure, segmentation, and depth) and applying a multiply-guided patch match. An example of which is described in "Inpainting at Modern Camera Resolution by Guided PatchMatch with Auto-curation" to L Zhang, C Barnes, K Wampler, S Amirghodsi, Eli Shechtman, Zhe Lin, Jianbo Shi-Computer Vision-ECCV 2022: 17$^{th}$ European, 2022, the entire disclosure of which is hereby incorporated by reference in its entirety. As a result, this technique is configured to address regions having a larger size than other types of inpainting modules. Accordingly, the size determination module 214 is configurable to select an inpainting module that implements SuperCAF for region having a size that is greater than a threshold amount, e.g., of pixels.

A generative adversarial network (GAN) based inpainting module 228 is configured to leverage deep learning models that are trained together in a competitive manner. An example of a GAN that supports inpainting operations is referred to as a contextual and mask-aware generative adversarial network (CM-GAN). A CM-GAN incorporates contextual and mask-aware functionality as a guide to context of the regions 204 in order to generate the inpainting region 224. The CM-GAN, for instance, leverages adversarial loss and reconstruction loss to encourage production of a visually consistent inpainting region 224.

The diffusion-based inpainting module 230 is representative of functionality to utilize diffusion-based techniques for implementing inpainting operations. Examples of diffusion-based techniques as implemented by a respective diffusion generative model include latent-based diffusion techniques which operate on a latent space and pixel-based diffusion techniques that operate directly on pixel color values. Examples of these techniques are described in "High-Resolution Image Synthesis with Latent Diffusion Models" to Robin Rombach, Andreas Blattmann, Dominik Lorenz, Patrick Esser, Bjorn Ommer, arVix:2112.10752, CVPR 2022 and "Photorealistic Text-to-Image Diffusion Models with Deep Language Understanding" to Chitwan Saharia, William Chan, Saurabh Saxena, Lala Li, Jay Whang, Emily Denton, Dewed Kamyar Seyed Ghasemipour, Burcu Karagol Ayan, S. Sara Mahdavi, Rapha Gontijo Lopes, Tim Salimans, Jonathan Ho, David J. Fleet, Mohammad Norouzi, arXiv:2204.11487v1 [cs.CV] 23 May 2022, the entire disclosures of which are hereby incorporated by reference. A variety of other techniques are also contemplated.

As previously described, the inpainting dispatch module 118 is configured to leverage strengths and/or weaknesses of the inpainting modules in generating the inpainting selection 206. A CAF inpainting operation, for instance, is selected for regions for homogeneous texture synthesis in near real time for relatively small regions. A SuperCAF inpainting operation, on the other hand, is selected for high resolutions, includes good support for structures, and is utilized to relatively large regions. A CM-GAN operation is selected to provide good structure, good texture at low resolutions, and is usable for regions having a relatively medium size.

Thus, the inpainting dispatch module 118 is configured to select inpainting modules based on a variety of considerations, including timeliness, image quality, available resources, balance considerations such as quality and timeliness, and so forth. The edited digital image 222 is then received as having an inpainting region 224 (block 808) and is displayed in a user interface 110 (block 810) as further described below in relation to FIG. 6.

In an implementation, an artifact detection module 232 is employed automatically and without user intervention to detect whether the edited digital image 222 and inpainting region 224 include image artifacts. The artifact detection module 232, for instance, processes the edited digital image 222 to detect whether the inpainting region 224 generated by the referenced inpainting module includes an impermissible amount of artifacts based on a threshold, e.g., number of artifacts, artifact density, size of artifacts, and so on. If the artifact detection module 232 detects the inpainting region 224 includes an impermissible amount of artifacts, the inpainting dispatch module 118 selects an inpainting module from the plurality of inpainting modules that is different than the previously selected inpainting module. The inpainting dispatch module 118, for instance, may initially select an inpainting module for efficiency reasons, e.g., that uses CAF techniques. However, the artifact detection module 232 may then determine an impermissible amount of artifacts are created, and therefore switch to an inpainting module that has increased accuracy but consumes additional computations resources.

FIG. 4 depicts a system 400 in an example implementation showing operation of an inpainting dispatch module and associated region clustering module of FIG. 2 in greater detail. The inpainting dispatch module 118, in this example, maintains rules indicative of whether a corresponding inpainting module is compatible with a respective region, e.g., based on a given bounding box.

Accordingly, the inpainting dispatch module 118 first determines for each inpainting module whether the module is compatible with a region regardless of size (e.g., "Super-CAF"), whether the module is compatible with regions less than a threshold amount of size and context ratio (e.g., CM-GAN), and so forth. In the latter case, the inpainting dispatch module checks whether the bounding box size on each axis is less than or equal to a respective inpainting module's maximum size, e.g., 512 pixels for CM-GAN, 2048 pixels for CM-GAN-SR which is CM-GAN combined with a super-resolution module.

The inpainting dispatch module 118 is also configured to ensure there is sufficient context or background material for deep learning inpainting modules. In an example, the inpainting dispatch module 118 checks whether a product of a width and height of the bounding box is less than the "contextRatio"*"maxSize"*"maxSize," where "contextRatio" is a threshold constant (e.g., 0.5) and "maxSize" is a maximum size (e.g., defined as an amount of pixels) accepted by the corresponding inpainting module. In this way, the inpainting dispatch module 118 generates a set of rules for each inpainting module in this example for any given region that has a corresponding bounding box as to whether the given inpainting module can be used, i.e., is compatible.

To begin in the illustrated example, a region labeling module 402 is configured to generate labeled regions 404, e.g., based on the regions 204 received from the region input module 202. The labeling performed by the region labeling module 402 leverages a connected components routine to label connected regions in the digital image 106. If there is more than one connected component (e.g., shares a same label), in real world scenarios it is not uncommon that there then could be a multitude of connected components, e.g., thousands. This is often due to use of a color thresholding technique that could leave small stray pixels or groups of few stray pixels near a larger hole, a large number of objects that are inherently included that are to be removed (e.g., raindrops), and so forth. In practice, this multitude may cause performance challenges by invoking an inpainting module a corresponding number of times.

Accordingly, a merging module 406 is configured to generate merged regions 408 in a first merging pass. To do so, the merging module 406 partitions connected components into two groups: (1) regions that are below a threshold size 410 (e.g., "$\pi r^2$," where "r" is 0.007 fraction of a size of the digital image defined as a mean of the digital image's width and height) and (2) "ordinary" regions that are above-or-equal to the threshold size 410. In an implementation, a distance transform is computed for the ordinary regions and relatively small holes (e.g., below a threshold size) are merged into a nearest ordinary hole when closer than a second threshold distance, e.g., "0.018s" where "s" is a size of the digital image.

In real world scenarios, instances may occur in which a relatively large number of regions are encountered as described above. Accordingly, in an implementation if a number of regions is above a maximum threshold count (e.g., 50) then a weighted k-means clustering algorithm is used to cluster the regions, e.g., to be equal to or less than the threshold count. The weighted k-means clustering algorithm, in an example, operates similar to an ordinary k-means algorithm by assigning each data point (e.g., region after the connected components and first merging module 406) to the cluster center closest to it where distances are computed in Euclidean $R^2$ space. A cluster center is computed as a center of mass of each of the pixels that have been assigned to that cluster. Different from an ordinary k-means algorithm in which each of the clusters have equal weights, in the implementation described herein each cluster has a weight that is defined by its mass or total number of pixels in the cluster, and the cluster centers are computed considering this mass.

A classification module 412 is then employed to generate classified regions 414 that assign the merged regions for processing by a respective inpainting module. The classification module 412, for instance, is configurable to leverage functionality described for the region detection module 212 above, e.g., a size determination module 214, structure determination module 216, machine-learning module 218, and so forth.

Depending on which inpainting modules are enabled at runtime by the inpainting manager module 220, different inpainting selections 206 may be made. For instance, if a super-resolution module is enabled for CM-GAN then per the earlier rules about whether inpainting modules are compatible with corresponding bounding boxes, CM-GAN- SR may be able to accept regions up to 2048 pixels on each axis, whereas CM-GAN without super resolution is compatible with regions up to 512 pixels on each axis.

An optimization module 416 is then utilized in this example to improve computational resource efficiency in instances in which a plurality of regions share a same classification, i.e., are assigned for processing by a same inpainting module using a same inpainting techniques. If the inpainting operation involves a patch-match based technique (Barnes et al. 2009, A Randomized Correspondence Algorithm for Structural Image Editing), then regions are merged into a single pass for a corresponding inpainting module.

Moreover, if an inpainting module employs a deep-learning technique such as CM-GAN, then regions may be merged together for a single pass. For example, two regions that are near each other are merged and dispatched to CM-GAN as "covered" by a single bounding box and run in a single inference of CM-GAN and/or CM-GAN-SR as opposed to two separate inferences. Therefore, in a second pass of merging by the merging module 418, regions that have less than a threshold (e.g., "minHolePixels") amount of pixels are merged into the nearest region of any size if not more than a threshold distance (e.g., "maxMergeDistance") away. These constants are determined similarly as in the first stage of merging by the merging module 406 but with larger values in an implementation, e.g., 0.06 fraction of the digital image size for "minHolePixels" and 0.03 fraction of the digital image size for "maxMergeDistance."

In an implementation, contours (e.g., from boundary pixels) are computed of each region's cluster. Then, cluster distances are computed based on a minimum distance of respective contour pixels and considered as candidates for merging that are within "maxMergeDistance" distance of each other. The candidates are then merged if a given inpainting module is compatible with a size of the region's bounding box. The inpainting selection 206 is then output having regions 420 and corresponding classifications 422 identifying which inpainting module and associated inpainting technique is to be used to generate a corresponding inpainting region.

FIG. 5 depicts an example implementation 500 of clustering and inpainting module assignments made by an inpainting dispatch module. Regions 502, 504, 506(1)-506 (2), 508(1)-508(2), 510, and 512 are classified for processing as groups (e.g., as indicated using respective reference numbers), using a CMGAN-SR module at 1024 resolution. Region 514, on the other hand, is classified for processing by a patch-match algorithm.

Figure 6:
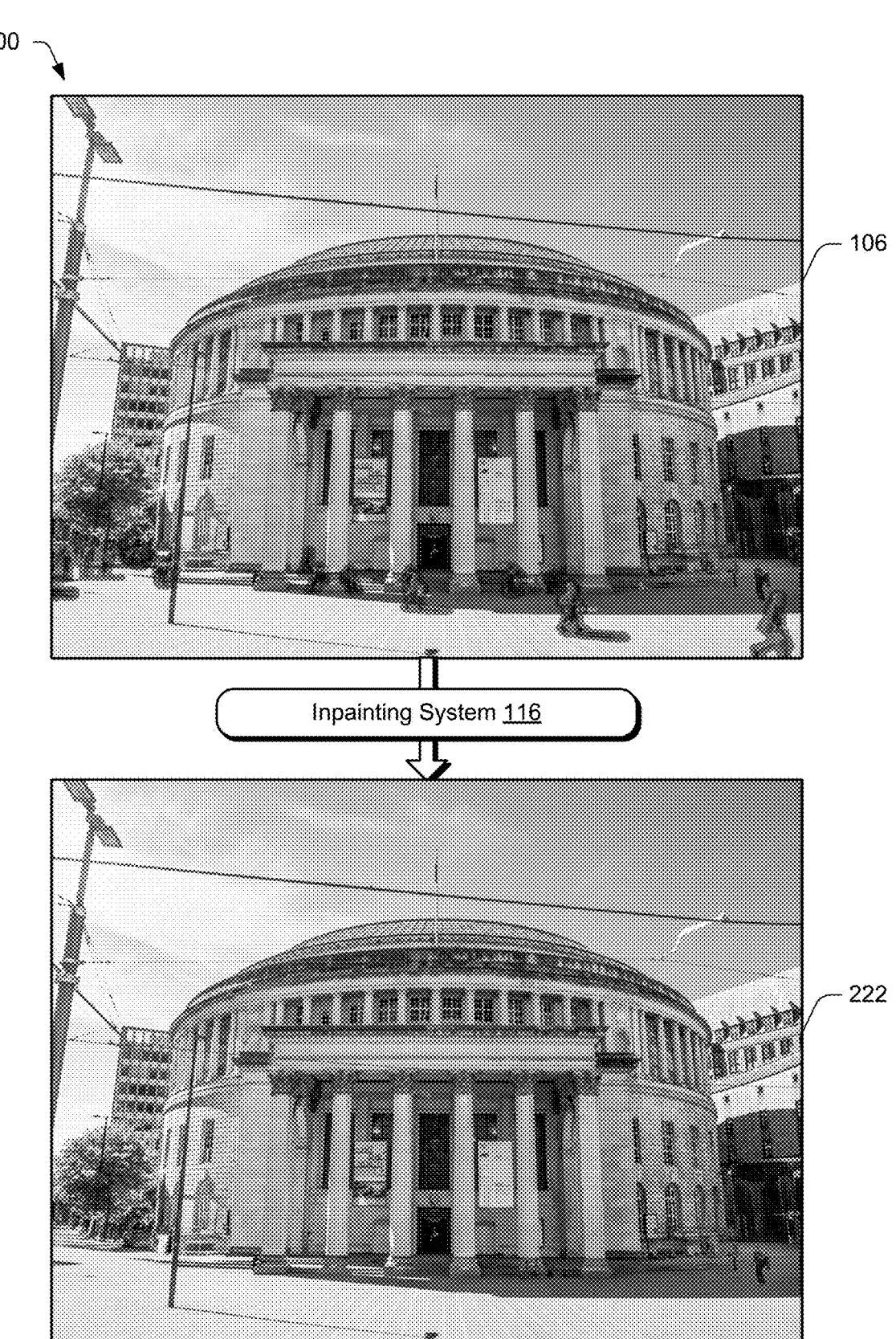
FIG. 6 depicts an example implementation of generation of inpainting selection that identifies use of a plurality of different inpainting modules to apply inpainting operations to a single digital image.

FIG. 6 depicts an example implementation 600 of generation of inpainting regions 224 of an edited digital image 222 for the regions identified in FIG. 4 by an inpainting module for the digital image. In this example, an object removal technique is utilized by the inpainting system 116 that leverages inpainting operations as implemented by selected inpainting modules.

FIG. 7 depicts an example implementation 700 of generation of an inpainting selection that identifies use of a plurality of different inpainting modules to apply inpainting operations to a single digital image. In the illustrated example, A CM-GAN inpainting module 702 is specified for a first plurality of regions that exhibit structure. A contextual attentional feature (CAF) inpainting module 704 is specified for a second plurality of regions based on texture and as being computationally-resource efficient. A super contextual attentional feature inpainting module 706 is specified for a third plurality of regions that have a size that over a defined threshold, i.e., are not compatible with CAF. In this way, a variety of different inpainting techniques are usable to process a single digital image.

Example System and Device

FIG. 9 illustrates an example system generally at 900 that includes an example computing device 902 that is representative of one or more computing systems and/or devices that implement the various techniques described herein. This is illustrated through inclusion of the inpainting system 116. The computing device 902 is configurable, for example, as a server of a service provider, a device associated with a client (e.g., a client device), an on-chip system, and/or any other suitable computing device or computing system.

The example computing device 902 as illustrated includes a processing device 904, one or more computer-readable media 906, and one or more I/O interface 908 that are communicatively coupled, one to another. Although not shown, the computing device 902 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing device 904 is representative of functionality to perform one or more operations using hardware. Accordingly, the processing device 904 is illustrated as including hardware element 910 that is configurable as processors, functional blocks, and so forth. This includes implementation in hardware as an application specific integrated circuit or other logic device formed using one or more semiconductors. The hardware elements 910 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 906 is illustrated as including memory/storage 912 that stores instructions that are executable to cause the processing device 904 to perform operations. The memory/storage 912 represents memory/storage capacity associated with one or more computer-readable media. The memory/storage 912 includes volatile media (such as random access memory (RAM)) and/or nonvolatile media (such as read only memory (ROM), Flash memory, optical disks, magnetic disks, and so forth). The memory/storage 912 includes fixed media (e.g., RAM, ROM, a fixed hard drive, and so on) as well as removable media (e.g., Flash memory, a removable hard drive, an optical disc, and so forth). The computer-readable media 906 is configurable in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 902. By way of example, and not limitation, computer-readable media includes "computer-readable storage media" and "computer-readable signal media."

"Computer-readable storage media" refers to media and/or devices that enable persistent and/or non-transitory storage of information (e.g., instructions are stored thereon that are executable by a processing device) in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 902, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 910. The computing device 902 is configured to implement particular instructions and/or functions corresponding to the software and/or hardware modules. Accordingly, implementation of a module that is executable by the computing device 902 as software is achieved at least partially in hardware, e.g., through use of computer-readable storage media and/or hardware elements 910 of the processing device 904. The instructions and/or functions are executable/operable by one or more articles of manufacture (for example, one or more computing devices 902 and/or processing devices 904) to implement techniques, modules, and examples described herein.

The techniques described herein are supported by various configurations of the computing device 902 and are not limited to the specific examples of the techniques described herein. This functionality is also implementable all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 include applications and/or data that can be utilized while computer processing is executed on servers that are remote from the computing device 902. Resources 918 can also include services provided over the Internet and/or through a subscriber network, such as a cellular or Wi-Fi network.

The platform 916 abstracts resources and functions to connect the computing device 902 with other computing devices. The platform 916 also serves to abstract scaling of resources to provide a corresponding level of scale to encountered demand for the resources 918 that are implemented via the platform 916. Accordingly, in an interconnected device embodiment, implementation of functionality described herein is distributable throughout the system 900. For example, the functionality is implementable in part on the computing device 902 as well as via the platform 916 that abstracts the functionality of the cloud 914.

In implementations, the platform 916 employs a "machine-learning model" that is configured to implement the techniques described herein. A machine-learning model refers to a computer representation that can be tuned (e.g., trained and retrained) based on inputs to approximate unknown functions. In particular, the term machine-learning model can include a model that utilizes algorithms to learn from, and make predictions on, known data by analyzing training data to learn and relearn to generate outputs that reflect patterns and attributes of the training data. Examples of machine-learning models include neural networks, convolutional neural networks (CNNs), long short-term memory (LSTM) neural networks, decision trees, and so forth.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:

receiving, by a processing device, a digital image having one or more regions that are identified for use as part of an inpainting operation including merged regions generated by merging connected regions of the digital image;

selecting, by the processing device, a first inpainting module from a plurality of inpainting modules based on an amount of structure detected in an area of the digital image disposed proximal to the one or more regions;

receiving, by the processing device, the digital image as having an inpainting region generated by the inpainting operation applied to the one or more regions as performed by the first inpainting module;

responsive to detecting that the inpainting region generated by the first inpainting module includes an impermissible amount of artifacts based on a threshold, selecting a second inpainting module from the plurality of inpainting modules that is different than the first inpainting module; and displaying, by the processing device, the digital image in a user interface including by regenerating the inpainting region by applying a second inpainting operation to the one or more regions as performed by the second inpainting module.

2. The method as described in claim 1, wherein the inpainting operation is configured to generate color values for pixels in the one or more regions.

3. The method as described in claim 1, wherein the selecting based on the amount of structure an amount of variability of pixels in the area of the digital image.

4. The method as described in claim 1, wherein the selecting the first inpainting module is based on a size of the one or more regions.

5. The method as described in claim 1, wherein the selecting the first inpainting module is performed using a machine-learning model.

6. The method as described in claim 1, wherein the selecting the first inpainting module is based on a determination that balances an amount of computational resource consumption by the plurality of inpainting modules, respectively, and quality of the inpainting region generated by the plurality of inpainting modules, respectively.

7. The method as described in claim 1, wherein the selecting includes:

generating labeled regions by labelling the connected regions;

generating the merged regions by merging the labeled regions;

generating classified regions by classifying the merged regions for use by a respective inpainting module of the plurality of inpainting modules; and outputting an inpainting selection as specifying the classified regions.

8. The method as described in claim 7, further comprising optimizing the classified regions by merging at least two of the classified regions based on respective classifications.

9. The method as described in claim 1, wherein the plurality of inpainting modules include a patch-based inpainting module, a generative adversarial network (GAN) inpainting module, or a diffusion-based inpainting module.

10. The method as described in claim 1, wherein the impermissible amount of artifacts is based on at least one of a number of artifacts, an artifact density, or a size of artifacts in the inpainting region.

11. An inpainting system comprising:

an inpainting dispatch module implemented by a processing device to generate an inpainting selection referencing a first inpainting module, the generating including selecting the first inpainting module from a plurality of inpainting modules using a machine-learning model based on result accuracy; and the first inpainting module implemented by the processing device to perform an inpainting operation, based on the inpainting selection, to generate an inpainting region within one or more regions of a digital image by merging connected regions of the digital image; and responsive to detecting that the inpainting region generated by the first inpainting module includes an impermissible amount of artifacts based on a threshold, the inpainting dispatch module implemented by the processing device to select a second inpainting module from the plurality of inpainting modules that is different than the first inpainting module and regenerate the inpainting region by applying a second inpainting operation to the one or more regions.

12. The inpainting system as described in claim 11, wherein the inpainting dispatch module is configured to select the first inpainting module based on an amount of structure detected in an area of the digital image disposed proximal to the one or more regions.

13. The inpainting system as described in claim 11, wherein the inpainting dispatch module is configured to select the first inpainting module based on a size of the one or more regions.

14. The inpainting system as described in claim 11, wherein the inpainting dispatch module is configured to select the first inpainting module using the machine-learning model as balancing the result accuracy with an amount of time to perform the inpainting operation, respectively.

15. A computing device comprising:

a processing device; and a computer-readable storage medium storing instructions that, responsive to execution by the processing device, causes the processing device to perform operations including:

receiving a digital image having one or more regions that are each identified for use as part of an inpainting operation including merged regions generated by merging connected regions of the digital image;

selecting a first inpainting module from a plurality of inpainting modules based on a size of the one or more regions;

receiving the digital image as having an inpainting region generated by the inpainting operation applied to the one or more regions as performed by the first inpainting module;

responsive to detecting that the inpainting region generated by the first inpainting module includes an impermissible amount of artifacts based on a threshold, selecting a second inpainting module from the plurality of inpainting modules that is different than the first inpainting module; and displaying the digital image in a user interface including by regenerating the inpainting region by applying a second inpainting operation to the one or more regions as performed by the second inpainting module.

16. The computing device as described in claim 15, wherein the selecting the first inpainting module is further based on an amount of structure detected in an area of the digital image disposed proximal to the one or more regions.

17. The computing device as described in claim 15, wherein the selecting the first inpainting module is further based on a determination that balances an amount of computational resource consumption by the plurality of inpainting modules, respectively, and quality of the inpainting region generated by the plurality of inpainting modules, respectively.

18. The computing device as described in claim 15, wherein the selecting includes:

generating labeled regions by labelling the connected regions of the one or more regions;

generating the merged regions by merging the labeled regions;

generating classified regions by classifying the merged regions for use by a respective inpainting module of the plurality of inpainting modules; and outputting an inpainting selection as specifying the classified regions.

19. The computing device as described in claim 18, further comprising optimizing the classified regions by merging at least two of the classified regions based on respective classifications.

20. The computing device as described in claim 15, wherein the impermissible amount of artifacts is based on at least one of a number of artifacts, an artifact density, or a size of artifacts in the inpainting region.

* * * * *